(12) United States Patent
Spiegel (10) Patent No.: US 7,188,220 B2
(45) Date of Patent: Mar. 6, 2007

(54) METHOD AND SYSTEM FOR MANAGING THE CONTENTS OF AN EVENT LOG STORED WITHIN A COMPUTER

(75) Inventor: Richard Spiegel, Norcross, GA (US)

(73) Assignee: American Megatrends, Inc., Norcross, GA (US)

( * ) Notice: Subject to any disclaimer, the term of this patent is extended or adjusted under 35 U.S.C. 154(b) by 807 days.

(21) Appl. No.: 10/395,592

(22) Filed: Mar. 24, 2003

(65) Prior Publication Data

US 2004/0194114 A1 Sep. 30, 2004

(51) Int. Cl.
*G06F 12/16* (2006.01)
(52) U.S. Cl. .............................. 711/155; 714/18; 714/19
(58) Field of Classification Search ...................... None
See application file for complete search history.

(56) References Cited

U.S. PATENT DOCUMENTS 6,125,392 A * 9/2000 Labatte et al. ............... 709/224
6,560,722 B1 * 5/2003 Frankel et al. ................. 714/38
7,080,285 B2 * 7/2006 Kosugi et al. ................. 714/36

* cited by examiner

*Primary Examiner*—T Nguyen
(74) *Attorney, Agent, or Firm*—Hope Baldauff Hartman, LLC (57) ABSTRACT

Methods and systems for utilizing and recording, writing, or logging data regarding system events occurring within a computer are provided. These systems and methods define a unique erased value, such as the hexadecimal value 0FFh, that identifies unused memory records in an event log. When the computer system receives notification that an event has occurred, it searches for the next memory record containing the erased value in a memory record field designated as a search byte field. Once the unused record is found, the event data concerning the event that occurred is stored in the identified memory record, without updating a pointer to the next unused record. A power event method is provided to update the pointer. A utility application is also provides functions for reading, displaying, erasing, and compiling and displaying statistics concerning the event data in the event log independent of a next unused memory record pointer.

31 Claims, 7 Drawing Sheets

METHOD AND SYSTEM FOR MANAGING THE CONTENTS OF AN EVENT LOG STORED WITHIN A COMPUTER

TECHNICAL FIELD

Embodiments of the invention relate generally to the field of computer system diagnostics. More particularly, embodiments of the invention relate to the field of managing the contents of an event log stored within a computer.

BACKGROUND OF THE INVENTION

Diagnosing problems or abnormalities with a computer system is facilitated by industry standards for how motherboard and system vendors present system management information about their products. For instance, problems that occur during startup or runtime, such as memory test failure, system temperature out of range, or system errors may be recorded in a system event log. System event logs are an important part of computer system diagnostics and are specified by industry standards.

According to one industry standard an event log is a fixed-length area within a non-volatile storage media such as non-volatile random access memory ("NVRAM"). Some vendors, to fulfill this requirement in a cost effective manner, store the event log in the same flash memory where the basic input/output system ("BIOS") is stored. However, the block erasing limitations of flash memory create problems for some operating systems when event data and other information is recorded. In particular, previous systems require a pointer or index address, identifying the next unused or free memory record in the event log, to be updated whenever data regarding a new event is stored. Currently available utility programs depend on this index to read and manipulate event logs. However, due to the limitations of NVRAM, a block erase must be performed before the updated index can be written to the log. Block erasing requires the entire block of flash memory to be saved to random access memory ("RAM"), updated, and then erased from the NVRAM before re-writing the updated information. As a result, it may take as long as six to eight seconds to save, update, erase, and rewrite a 64 kilobyte block of flash memory. For this reason, the size of the event logs may be limited to 16 kilobytes or less to keep the block erasing that accompanies event log recording in previous systems to a minimum.

When events are recorded during runtime, a System Management Interrupt ("SMI") is generated by the computer system hardware. This interrupt is transparent to the operating system and gives control of the system to a System Management Mode ("SMM") state until the recording is completed. The operating system will not notice the SMM state and will respond as if the operating system is hung after a period of time. If interrupting the operating system to record system event data in an event log takes longer than allowed by the operating system, the operating system may require a system reboot. Furthermore, computers that are expected to be highly available such as server computers cannot afford to be non-responsive during the SMM.

It is with respect to these considerations and others that the various embodiments of the present invention have been made.

SUMMARY OF THE INVENTION

In accordance with the present invention, the above and other problems are solved by methods and systems for managing the contents of an event log stored within a computer. These systems and methods define a unique erased value, such as the hexadecimal value 0FFh (hexadecimal values are designated herein by a little "h"), that identifies unused memory records in an event log. When the computer system receives notification that an event has occurred, the erased value identifies the next unused or free memory record in the event log. This is accomplished by searching for a memory record that contains only the erased value. For instance, 0FFh is the value of an erased byte in flash memory. Once the unused memory record is located, event data regarding the event that occurred, is stored in the identified memory record. A previously stored index or pointer indicator containing the address of the next unused memory record is not updated concurrently with the storage of the new entry in the event log. Rather, the index or pointer is updated subsequently at a time when the necessary block erase will not affect system performance.

By writing or recording event data only in unused or erased memory records and waiting to update or change an index or pointer, saving and erasing blocks of flash memory during runtime and extensive time delays are avoided. For each event that occurs, writing is reduced to only the bytes that make up one record, instead of an entire block of memory. Furthermore, event logs that utilize these methods and systems may have a larger memory capacity, which may be very advantageous for computer server applications that operate for extended periods of time.

In accordance with other aspects, the index identifying the next unused memory record in the event log may be updated in response to the occurrence of a system power event. A system power event may include the powering on or the reset of a computer system. In response to the powering on event, updates to the index may occur before or after power on test procedures such as power on self test ("POST"). In order to update the index, the next unused memory record is found and its identified location is then compared to an index indicator or address previously stored in the event log header that identifies the next unused memory record. If the previously stored address or indicator does not match the actual next unused memory record location, the index is updated to reflect the actual next unused memory record location.

In accordance with other aspects, an operating system independent utility application for performing functions on events recorded in the event log is provided. Unlike currently available utility programs that rely on the index to read and manipulate the event log, the functions performed by this utility application are independent of a stored index. The utility application provides functions for reading and displaying the events. Moreover, the utility may display these events with a timestamp and in various languages. The utility may also erase the events recorded in the event log and update the index accordingly in case currently available programs need to read or manipulate the event log. Furthermore, the utility may mark events as viewed or read such that the marked events no longer appear in subsequent displays. The utility application is also capable of compiling and displaying statistics concerning the total size of the event log, the number of unread events, and the number of unused memory records in the event log, all without the use of a previously stored index or pointer that identifies the end of the event log.

Aspects of the invention may be implemented as a computer process, a computing system, or as an article of manufacture such as a computer program product or computer-readable medium. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features as well as advantages, which characterize the present invention, will be apparent from a reading of the following detailed description and a review of the associated drawings.

DETAILED DESCRIPTION

As described briefly above, embodiments of the present invention provide methods and systems for recording the occurrence of events within a computer. In the following detailed description, references are made to accompanying drawings that form a part hereof, and in which are shown by way of illustration specific embodiments or examples. These embodiments may be combined, other embodiments may be utilized, and structural changes may be made without departing from the spirit and scope of the present invention. The following detailed description is, therefore, not to be taken in a limiting sense, and the scope of the present invention is defined by the appended claims and their equivalents.

Figure 1:
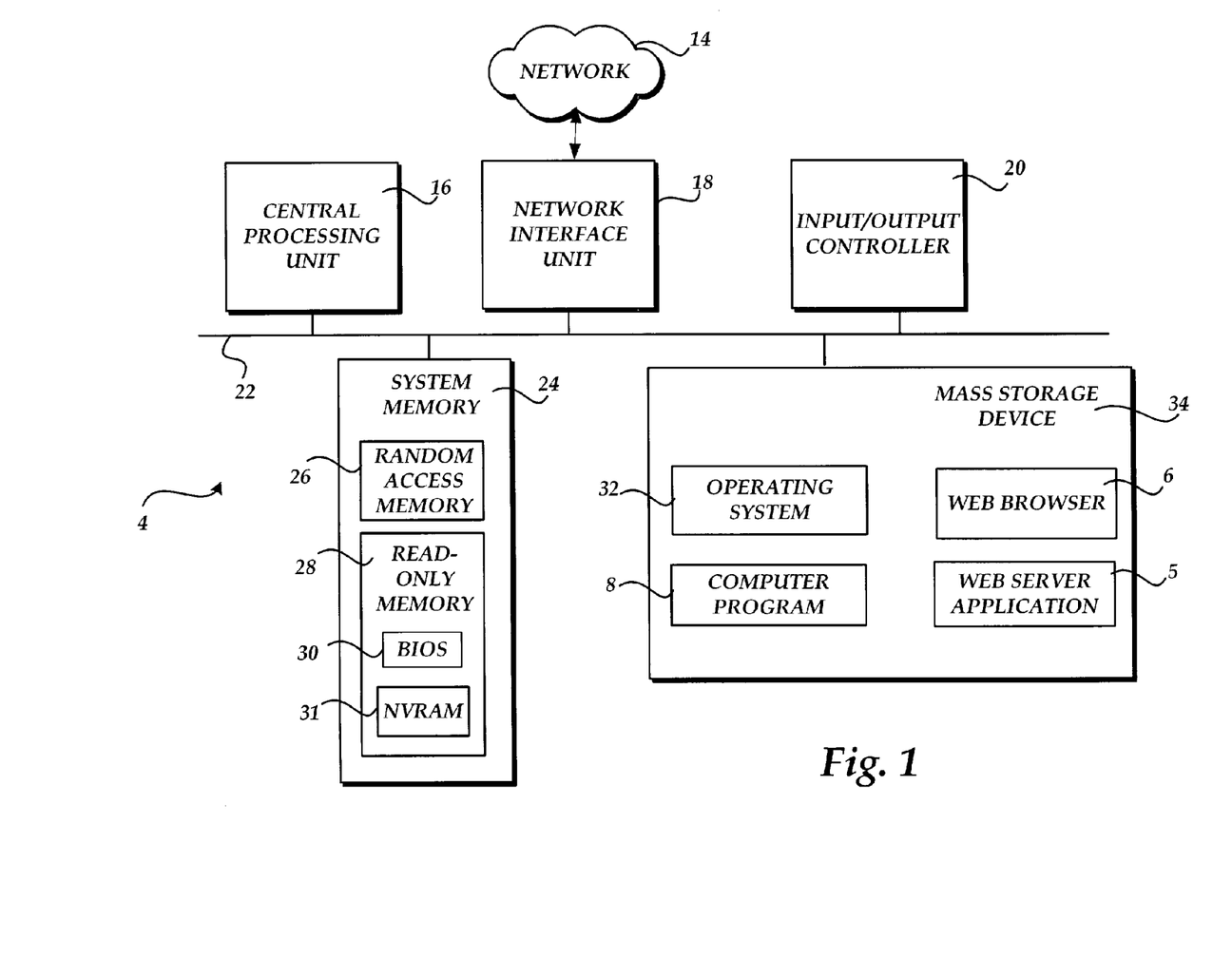
FIG. 1 illustrates a computer architecture for a computer system utilized in the various embodiments of the invention.
Figure 2:
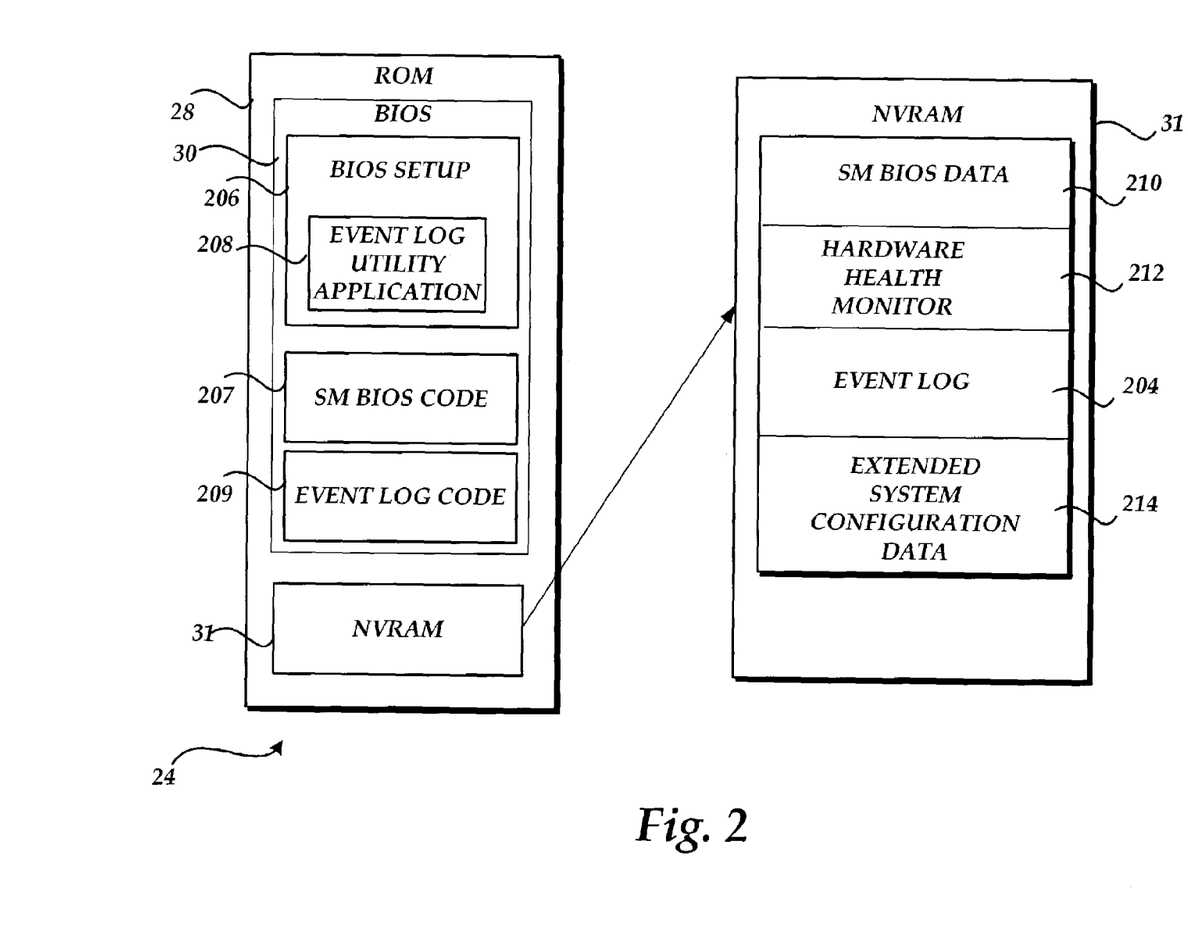
FIG. 2 illustrates a memory architecture for a system memory utilized in the various embodiments of the invention.

Referring now to the drawings, in which like numerals represent like elements through the several figures, aspects of the present invention and the exemplary operating environment will be described. FIGS. 1–2 and the following discussion are intended to provide a brief, general description of a suitable computing environment in which the embodiments of the invention may be implemented. While the invention will be described in the general context of program modules that execute in conjunction with a BIOS program that executes on a personal or server computer, those skilled in the art will recognize that the invention may also be implemented in combination with other program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Referring now to FIG. 1, an illustrative computer architecture for a computer 4 for practicing the various embodiments of the invention will be described. The computer architecture shown in FIG. 1 illustrates a conventional server or personal computer 4, including a central processing unit 16 ("CPU"), a system memory 24, including a random access memory 26 ("RAM") and a read-only memory ("ROM") 28, and a system bus 22 that couples the memory to the CPU 16. A basic input/output system 30 containing the basic routines that help to transfer information between elements within the computer, such as during startup, is stored in the ROM 28. The BIOS 30 also provides functionality for recording the occurrence of events occurring within the computer 4 and for manipulating a log of the events. As will be described in greater detail below, the event log may be stored in the NVRAM 31. Specifications regarding the structure and storage of event logs are referenced in System Management BIOS ("SMBIOS") Reference Specification, version 2.3.3 published by the Distributed Management Task Force, Inc. ("DMTF"). Additional details regarding the operation of the BIOS 30 in this regard will be described below with respect to FIGS. 2–5.

The computer 4 further includes a mass storage device 34 for storing an operating system 32 suitable for controlling the operation of a networked computer, such as the WINDOWS NT or XP operating systems from MICROSOFT CORPORATION of Redmond, Wash. The mass storage device 34 may also store application programs, such as the web server application program 5, the web browser 6, and the computer program 8. The mass storage device 34 is connected to the CPU 16 through a mass storage controller (not shown) connected to the bus 22. The mass storage device 34 and its associated computer-readable media, provide non-volatile storage for the computer 4. Although the description of computer-readable media contained herein refers to a mass storage device, such as a hard disk or CD-ROM drive, it should be appreciated by those skilled in the art that computer-readable media can be any available media that can be accessed by the computer 4.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

According to various embodiments of the invention, the computer 4 may operate in a networked environment using logical connections to remote computers through a network 14, such as the Internet or a LAN. The computer 4 may connect to the network 14 through a network interface unit 18 connected to the bus 22. It should be appreciated that the network interface unit 18 may also be utilized to connect to other types of networks and remote computer systems. The computer 4 may also include an input/output controller 20 for receiving and processing input from a number of devices, including a keyboard, mouse, or electronic stylus (not shown in FIG. 1). Similarly, an input/output controller 20 may provide output to a display screen, a printer, or other type of output device.

Turning now to FIG. 2, an illustrative system memory architecture for the ROM 28 and the NVRAM 31 utilized in the various embodiments of the invention will be described. As described above, the BIOS 30 is stored within the ROM 28. Stored within the BIOS 30, among other items, is the BIOS Setup Utility 206, SMBIOS code 207, and the event log code 209. The BIOS setup 206 includes the event log utility application 208 which may be utilized for event log manipulation without utilizing an index address or the operating system 32. The utility 208 has numerous features that will be described in detail below with respect to FIG. 5.

The SMBIOS code 207 controls system management activity such as retrieving information about the system, updating data areas, and reporting system errors. The event log code 209 directs the recording of system event data within the NVRAM 31 in the event log data area 204. The event log data area 204 stores a record of system events and may range from 1–64 kilobytes in size according to industry standards. In view of the embodiments of the invention, the event log data area 204 may be larger than 64 kilobytes without incurring additional delay while recording events. Additional details regarding the event log data area 204 will be described below with respect to FIG. 3. Also included in the NVRAM 31 is the SMBIOS data 210, the hardware health monitor ("HHF") 212, and the extended system configuration data ("ESCD") 214 where data regarding system operating parameters and formats is stored.

Figure 3:
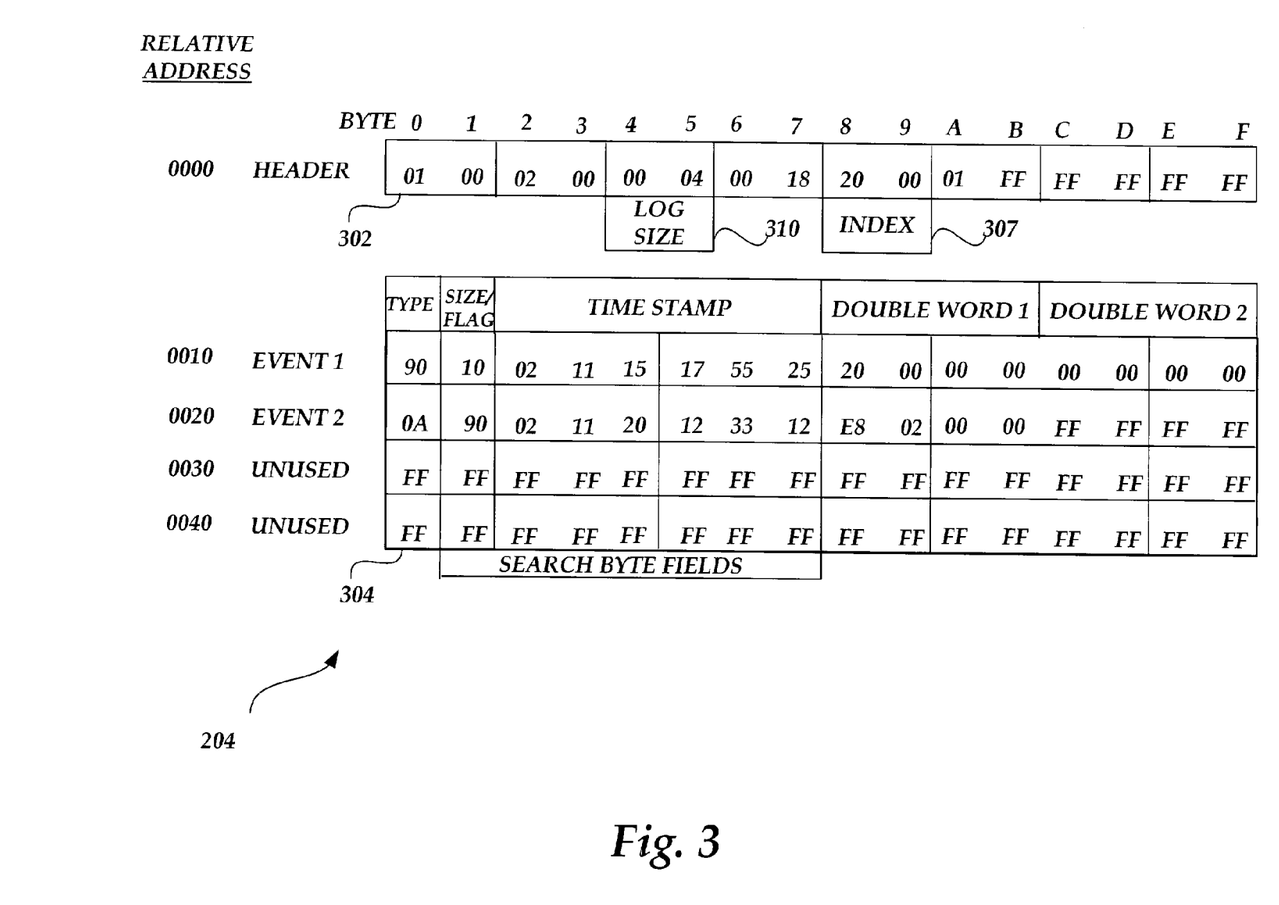
FIG. 3 shows a segment of an event log provided in one embodiment of the invention.

Referring now to FIG. 3, a segment of the event log data area 204 provided in one embodiment of the invention will be described. The event log data area 204 is divided into memory records, or blocks, of 16 bytes. The first 16 byte memory record, beginning at relative address '0000', is the header record 302. The subsequent 16 byte memory records, or blocks, 304, represented by relative addresses '0010–0040', are each capable of storing data for one event.

Previously stored within the header 302 at bytes 8 and 9 is a pointer or index address 307 which identifies the next unused or erased memory record where the entry for the next event may be stored. In previous systems, the index 307 was updated during runtime whenever a system event occurred. This previous method of updating requires the entire block of flash memory in the event log data area 204, the SMBIOS data 210, the HHF 212, and the ESCD 214 to be saved to alternative memory and erased from NVRAM so that the index 307 can be updated to reflect the next unused memory record. The index 307 would contain an address relative to the header address identifying where the next available 16 byte memory record is located. However, in one embodiment, the index 307 is only updated in response to a power event such as the powering on of the system after the completion of POST. As illustrated in FIG. 3, the index contains the hexadecimal word '0020' which indicates that the record at that address is erased. However, as will be described in greater detail below, '0020' is not the next unused memory record.

Free or unused memory records within the event log data area 204 are identified by an erased value or code '0FFh' in hexadecimal format. All the bits are set to '1' one in memory fields or locations containing '0FFh'. When an event is written to an unused memory record some bits are selectively pulled to '0' zero and when an erase command is given to erase the event log data area 204, all the bits are returned to '1'. It should be appreciated that '0FFh' is presently the only search choice for an erased byte in flash memory.

The format for the event log memory records 304 is illustrated in FIG. 3. Byte 00h, or the first field of a memory record, is designated to store the event value or code representing the type of event. For instance at byte 00h of address '0020' the event type is identified in the first field by the value '0Ah'. According to industry standards '0Ah' is the value representing a peripheral component interface ("PCI") system error event type. Next, byte 01h of address '0020' represents the size of the event record and an indication or flag as to whether the event '0' has been read or '1' not. For example in this case a '90h' is stored in the field for size/flag with a binary equivalent of 1001 0000. Bit 7 of the binary equivalent of hexadecimal value '90h' will contain a 1, thereby indicating the event has not been marked as viewed or read. Bit 4 of the binary equivalent of '90h', also contains a 1, indicating the size of the record is 16 bytes. If the size/flag field contained a '10h' with a binary equivalent of 0001 0000, bit 7 would contain a zero, indicating the event was marked as viewed and bit 4 would still contain a one, indicating a 16 byte memory record size. Bytes 02h–07h represent the date and time the event occurred and bytes 08h–0Fh represent variable data formats in the form of hexadecimal double words. The variable data formats differ depending on the event type. It is apparent upon close examination that although the next unused memory record is at '0030', the index indicator or address 307 contains the hexadecimal word '0020'. The index 307 has not been updated to reflect the next unused memory record.

According to industry standards the field for event type and the double word fields may contain '0FFh' as a stored non-erased value. However, the 7 bytes from byte 01h–07h, representing the size/flag and the time stamp fields are not capable of storing '0FFh' as a non-erased value. Therefore, bytes 02h–07h may be utilized as search bytes, thereby making the size/flag, the date, and the time fields search byte fields only capable of containing the value '0FFh' for any byte if the entire memory record has erased status.

When the computer system receives notification that an event has occurred, event log code 209 identifies the next unused memory record. This is accomplished by searching for a next memory record containing a '0FFh' in any of the search byte fields. Once the next unused memory record is found, the event data described above is stored in the fields within the unused memory record.

By waiting to update the index 307 and recording events only in unused memory records, erasing blocks of flash memory during runtime and extensive time delays are avoided. Delays are avoided because the index never contains an erased value such as '0FFh' and therefore must be erased in order to update the address, while the event data is written to an area that already has erased status. Furthermore, event logs that utilize these methods and systems may now expand to a larger memory capacity without an unacceptable time delay, which may be very advantageous for computer server applications that are expected to operate for extended periods of time.

Figure 4A:
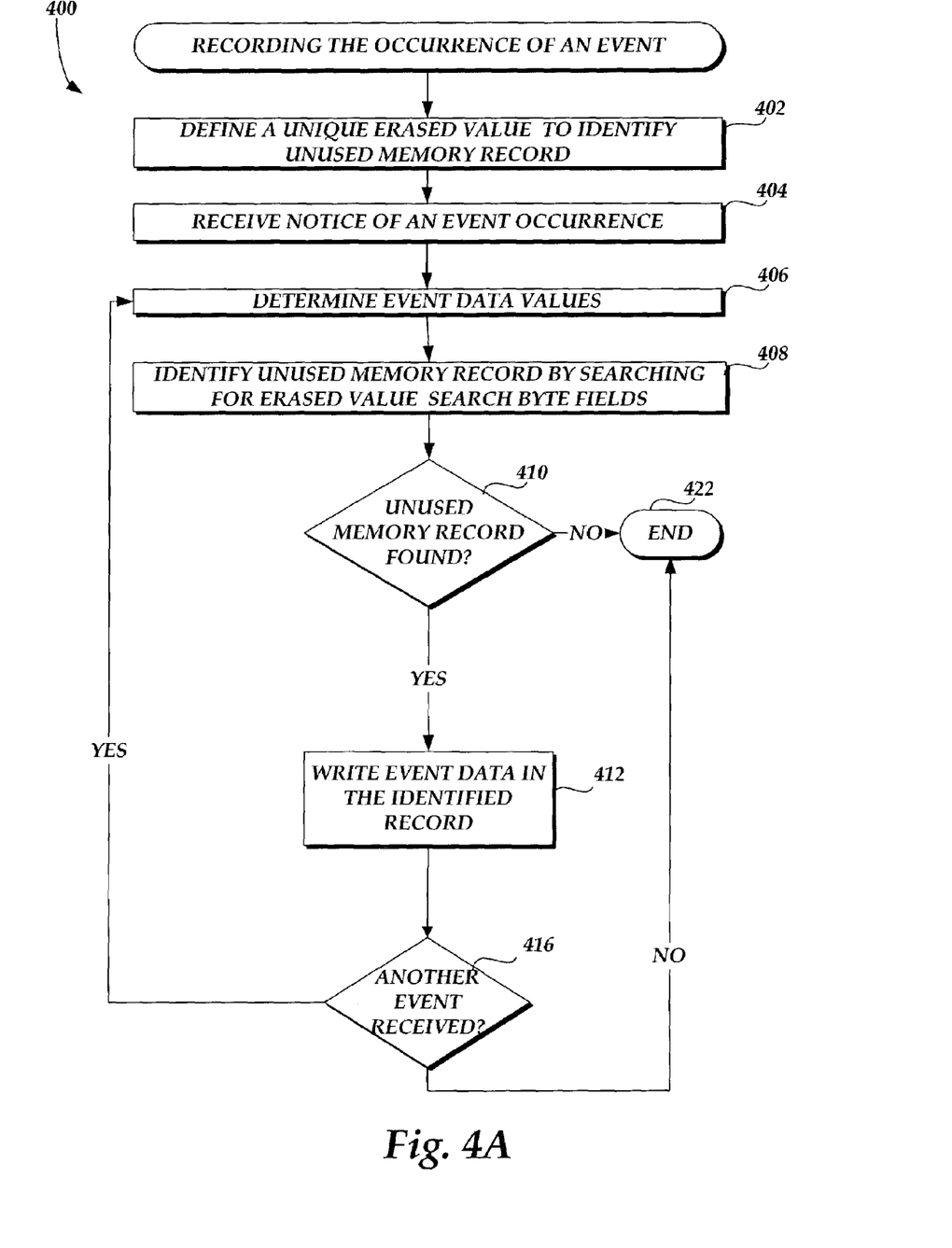
FIGS. 4A–4B illustrate an operational flow for recording the occurrence of an event and updating an index according to one embodiment of the invention.

Turning now to FIGS. 3 and 4A, an illustrative routine 400 will be described for recording the occurrence of an event according to one embodiment of the invention. The routine 400 begins at block 402, where a unique erased value, utilized to identify unused memory records, is defined. For flash memory this unique value is defined as '0FFh'. Next the routine 400 continues from block 402 to block 404, where notice of an event occurrence is received. It should be appreciated that the detection of a system event is hardware driven and a SMI is generated accordingly. Once the computer enters an SMM state, the event log code 209 searches for a next unused memory record in the event log data area 204 to record the event data.

From block 404, the routine 400 continues to block 406, where values for the event data are determined. First, the SMI cause is identified and a unique event value is assigned for the type of event that occurred from a list of predefined and OEM defined events. Secondly, complementary double words based on the event type are assigned. These double words provide additional information concerning the event. For example in FIG. 3 the double word 'E8 02 00 00', assigned to the '0Ah' runtime PCI error event type, identifies the bus, device, and function where the error occurred. Lastly, the date and time of the interrupt or event are read from the computer system CMOS clock.

From block 406, the routine 400 continues to block 408 where an unused memory record is identified by searching the event log data area 204 for a next memory record containing the erased value in a search byte field. This is accomplished by searching any search byte field for each record for the erased value '0FFh' to identify the next unused memory record. It should be appreciated, as described above, that the search byte fields may not store '0FFh' as a non-erased value, whereas the event type and double word fields may store '0FFh' as a non-erased value. Therefore, the search byte fields may include the size/flag, date, and time fields. At block 410, a determination is made as to whether an unused memory record has been found. If an unused memory record has not been found, the routine 400 terminates at block 422 and the event data is not recorded because the event log is full. If an unused memory record is found, the routine 400 continues from block 410 to block 412 where the event data corresponding to the event that occurred is written in the identified 16 byte memory record as described above in FIG. 3. Next, the routine 400 continues to block 416 where a determination is made as to whether another event notification has been received by searching the SMI status registers. If an event notification has been received, the routine 400 returns to block 406 described above. If an event notification has not been received the routine 400 terminates at block 422 by exiting the SMM and returning control to the operating system.

Figure 4B:
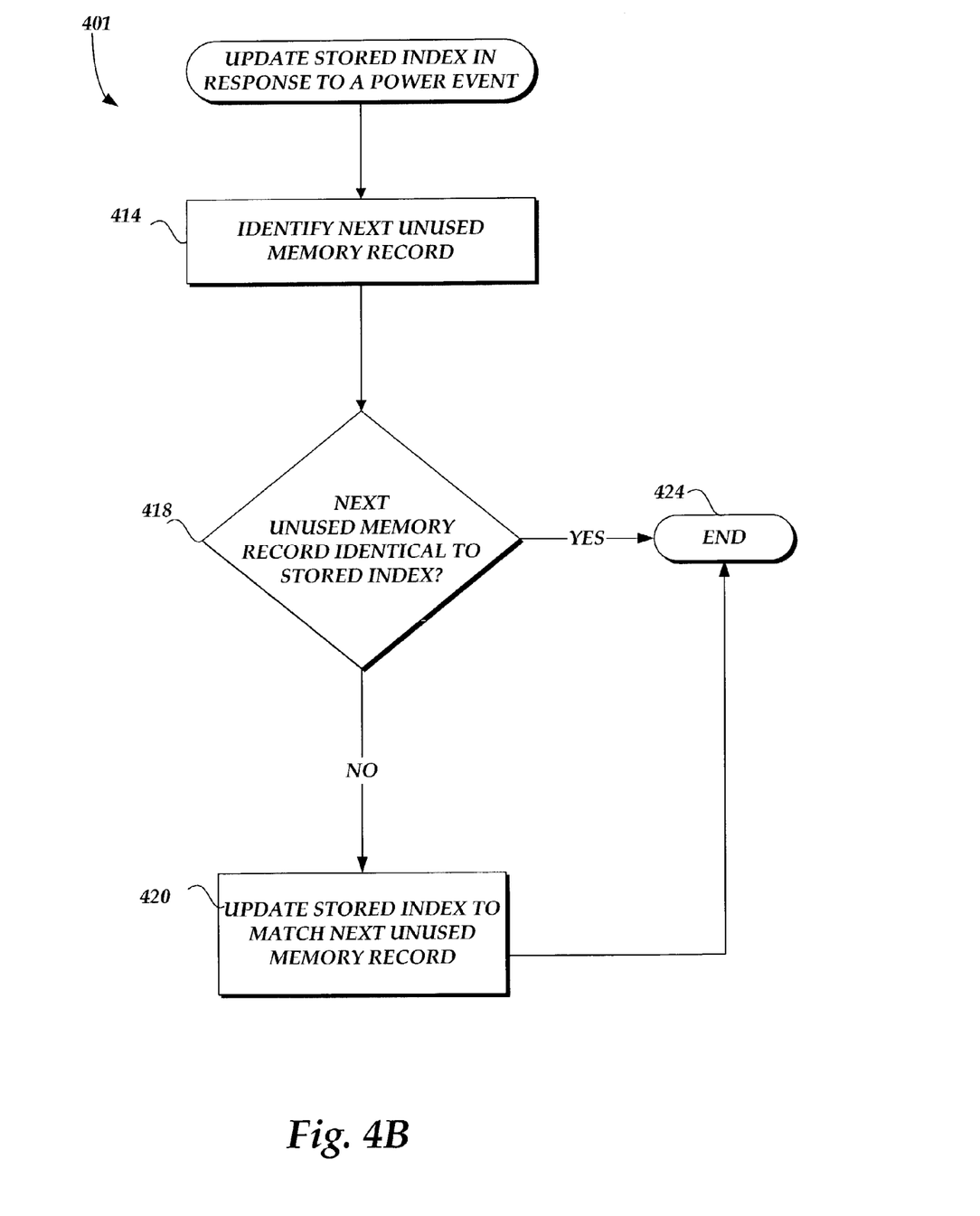

Referring now to FIG. 4B an operational flow for updating an index in response to a power event will be described. The routine 401 may be performed in response to the powering on or reset of a computer in order to make the event log backward compatible with currently available utilities. The routine 401 begins at block 414 where the next unused memory record is identified by searching search byte fields for the erased value '0FFh', similar to routine 400 block 408. The routine 401 continues from block 414 to block 418 where a comparison is made as to whether the index 307 within the header 302 of the event log is identical to the next unused memory record identified at block 414. If the index 307 is not identical, the routine 401 continues to block 420 where the index is updated to reflect the next unused memory record available to store the next event data entry. This index update requires the saving, updating, erasing, and re-writing of the entire NVRAM 31. The routine 401 then terminates at block 424. If the index 307 is identical to the next unused memory record, the routine 401 will terminate at block 424. It should be appreciated that utility programs that utilize the index 307 to identify event entries within a log will not have notification of events that have occurred subsequent to the power event. It is with this appreciation that one embodiment of the present invention provides an operating system independent event log utility 208 described below with respect to FIGS. 2, 3, and 5.

Figure 5:
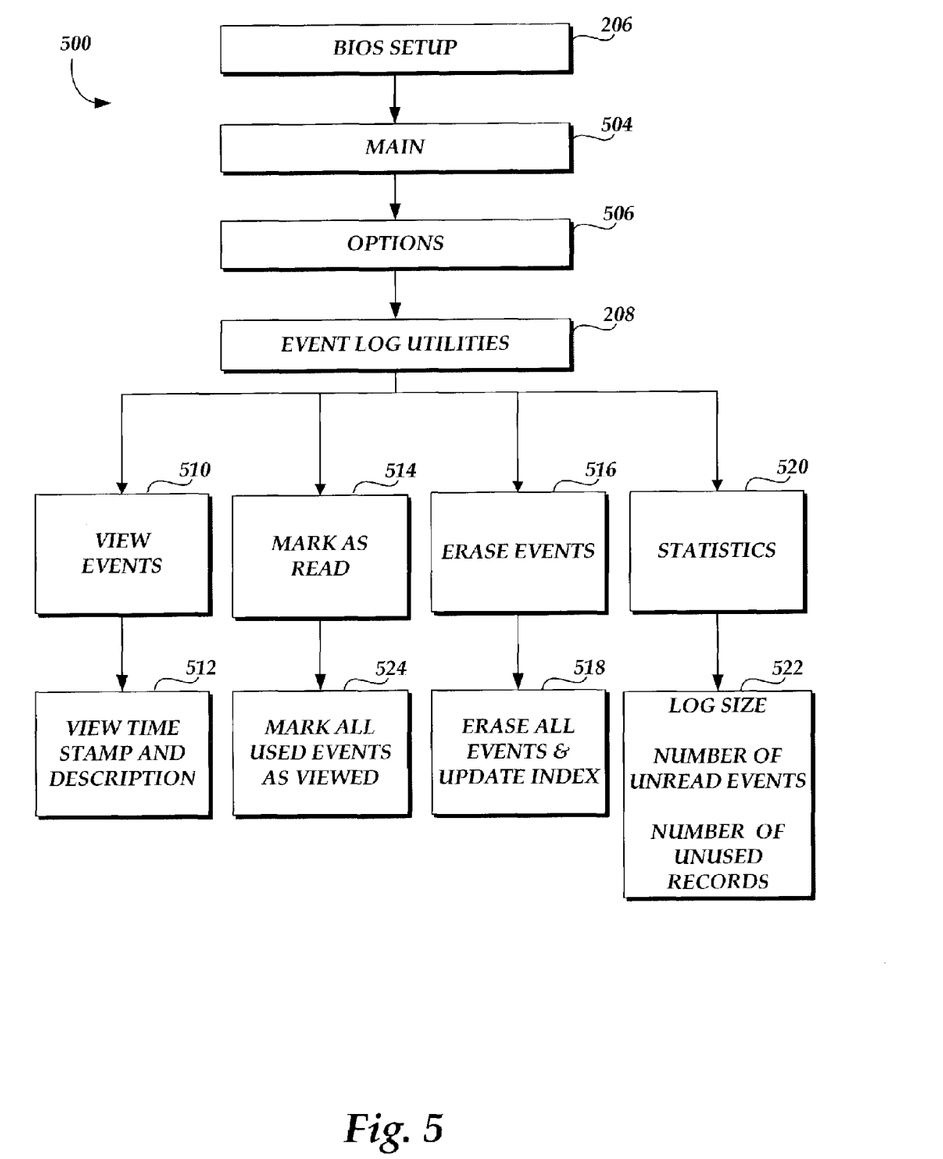
FIG. 5 illustrates the organization and capabilities of an event log utility application provided by one embodiment of the invention.

Turning now to FIGS. 2, 3, and 5, a block diagram 500 showing the organization and capabilities of an event log utility 208 utilized in one embodiment of the invention will be described. The event log utility 208 is part of the BIOS setup program 206. It is accessed through the main menu 504 and options menu 506 provided by the BIOS setup 206. The event log utility 208 has numerous functions to manage event records stored within the event log 204. It is made available to remove the need for currently available utility programs, which depend on a pointer or index to identify the next available memory location in the event log. Function 510 provides functionality for viewing the contents of the event log. Viewing capabilities 512 include a description of each event recorded in the log and the time and date that each event occurred. It should be appreciated that the event descriptions may be viewed in various languages such as Japanese and Greek.

Function 514 is operative to mark event records as read. Marking capabilities 524 include a user option to decide whether to mark the event records as viewed or read. Once the user chooses to mark the used records as read, the records are marked and will no longer be displayed in function 510 for viewing event records. As described above, an indicator as to whether an event record has been marked as read is stored in the event log 204 in byte 1 of the event record. For instance at address '0010' shown in FIG. 3, EVENT 1 has been read as denoted by the '0' in bit 7 of the binary equivalent of hexadecimal value '10h' within the byte 1 column.

Function 516 is operative to erase the event records in the log 204. Erase capabilities 518 include a user option to erase the entire event log. Once the event log is erased the index 307 within the event log header 302 is updated to reflect an empty event log. The erase function 516 may be utilized to clear an event log before or after it becomes full.

Turning now to function 520, operative to provide statistics regarding the event log 204. Statistic capabilities 522 include calculating and displaying the total size of the event log, the number of unread event records, and the amount of unused area remaining in the event log. Statistics may be helpful in making a decision as to whether it is time to erase the log. It should be appreciated that the functions 510, 514, 516, and 520 accomplish their functions without the use of a pointer or index that identifies the end of the event log.

Figure 6:
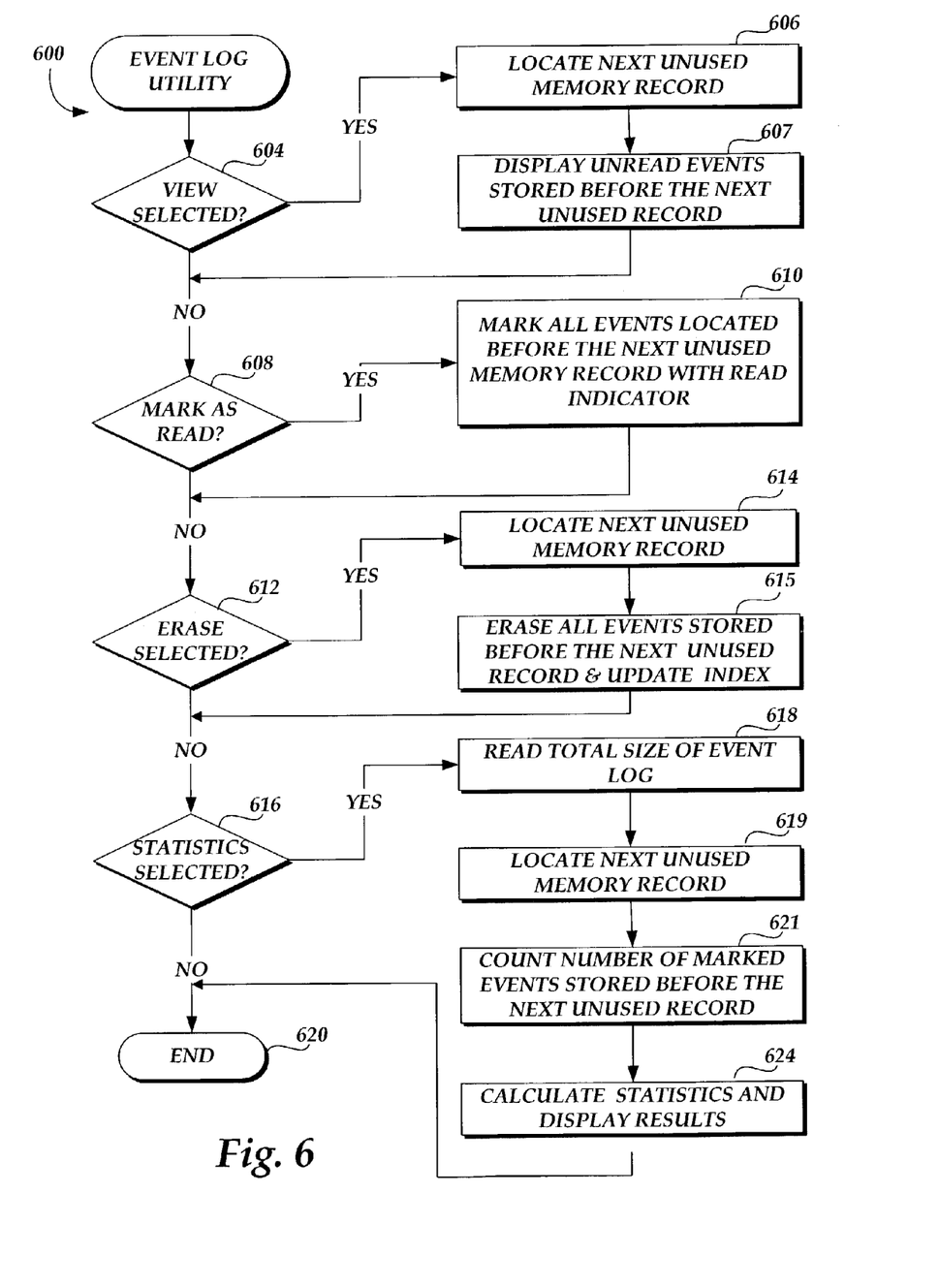
FIG. 6 illustrates an operational flow for utilizing an event log utility independent of a stored index in one embodiment of the invention.

Referring now to FIGS. 3, 5, and 6, an illustrative routine 600 for utilizing an event log utility independent of a previously stored index in one embodiment of the invention will be described. The routine 600 begins at block 604, where a determination is made as to whether a user of the event log utility application 208 has selected the view function 510. If the view function 510 has not been selected, the routine 600 continues to block 608 for another function selection determination described below. If the view function 510 has been selected the routine 600 continues to block 606 where, independent of the previously stored index 307, the next unused memory record is located by identifying the next memory record containing the erased value within any search byte field.

From block 606, the routine 600 continues to block 607, where events that have been stored before the next unused record and that have been marked as unread are displayed according to display criteria. An example of display criteria may be the display of the last 32 events stored before the next unused memory record and marked as unread. Unlike currently available utility programs, the routine 600 determines the end of the event log and performs the display function without utilizing the previously stored index 310. In contrast, and as illustrated in FIG. 3, currently available utility programs performing the view function would not display 'EVENT 2' because the index 307 would show the address '0020' as unused, thus the market available utility would not have notice that an event record was stored at address '0020' and thereby would not display the recorded 'EVENT 2'.

From block 607, the routine 600 continues to block 608 where a determination is made as to whether the marked as read function 514 has been selected. If the user has not selected the mark as read function, the routine 600 continues to block 612 for another function selection determination described below. If the mark as read function 514 has been selected, the routine 600 continues to block 610 where all the events located before the next unused memory record are marked as read. To perform the mark as read function 514, the routine 600 determines where the next unused memory record is located as described above, without the aid of an index 307, and then manipulates the events stored before the next unused memory record. From block 610 the routine continues to block 612 where a determination is made as to whether the erase function 516 has been selected. If the erase function has not been selected, the routine 600 continues to block 616 for another function selection determination described below.

If the erase function 516 has been selected, the routine 600 continues to block 614 where the next unused memory record is located by searching for the reserved event code stored in the event type field. Then at block 615, all of the events stored before the next unused memory record are erased from the event log and the index 307 is updated for use by market available utilities if necessary. The routine 600 then continues from block 615 to block 616 where a determination is made as to whether the statistics function 520 has been selected. If the statistics function 520 has not been selected the routine 600 ends at block 620. If the statistics function 520 has been selected, the routine 600 continues to block 618, where the total size of the event log area 204 is read from the header record 302 at the field 310. In this embodiment the hexadecimal word '0400' is stored in the field 310 at bytes 4 and 5 of the header 302. This word value is equal to 1 kilobyte in size. Then, at block 619, the next unused memory record is determined as described above without utilizing the index 307. At block 621, events that are stored before the next unused memory record and marked as unread are counted. Next the routine 600 continues from block 621 to block 624 where statistics for log size, the number of unread events, and the number of unused memory records are determined and displayed. For instance, the number of unused memory records in the log 204 is the difference between the total size of the log and the number of used memory records including the header 302. Next the routine 600 continues from block 624 to block 620 where the routine ends.

Based on the foregoing, it should be appreciated that the various embodiments of the invention provide methods and systems for recording the occurrence of an event. The above specification, examples and data provide a complete description of the manufacture and use of the composition of the invention. Since many embodiments of the invention can be made without departing from the spirit and scope of the invention, the invention resides in the claims hereinafter appended.

I claim:

1. A method for recording the occurrence of one or more events within a computer comprising:
   defining a unique erased value that identifies one or more unused memory records in an event log wherein each memory record comprises one or more fields;
   receiving a notification that at least one event has occurred;
   determining event data values based on the notification;
   in response to the occurrence of the at least one event, identifying at least one unused memory record in the event log by searching the event log for a next memory record containing the erased value in one or more search byte fields of the memory record; and
   in response to identifying the at least one unused memory record, storing in the identified memory record the event data values for the event that occurred.

2. The method of claim 1, further comprising:
   in response to the occurrence of a power event within the computer, identifying the location of a next unused memory record in the event log by searching the event log for a next memory record containing the erased value in one or more search byte fields of the memory record;
   determining whether the location of the next unused memory record is identical to a previously stored indicator of the next unused memory record; and
   in response to determining that the location of the next unused memory record is different than the previously stored indicator, updating the previously stored indicator to reflect the identified location of the next unused memory record.

3. The method of claim 2, wherein the power event comprises a powering on of the computer and wherein the previously stored indicator is updated prior to an execution of one or more power on test procedures.

4. The method of claim 2, wherein the power event comprises a powering on of the computer and wherein the previously stored indicator is updated subsequent to an execution of one or more power on test procedures.

5. The method of claim 2, wherein the power event comprises a reset of the computer.

6. The method of claim 4, wherein the previously stored indicator comprises an index address stored in one or more fields within a header record designated as the beginning record of the event log.

7. The method of claim 1, wherein receiving notification that an event has occurred comprises receiving a system management interrupt in response to the event occurring and wherein determining event data values comprises assigning a data value for the type of event that occurred and one or more complementary double words to the event type, and reading the date and time of the interrupt from an internal clock.

8. The method of claim 1, wherein the erased value comprises the hexadecimal value 0FFh.

9. The method of claim 8, wherein a one of the search byte fields comprises the field designated to store a size of the event record.

10. The method of claim 8, wherein a one of the search byte fields comprises the field designated to store a date on which the event occurred.

11. The method of claim 8, wherein a one the search byte fields comprises the field designated to store a time at which the event occurred.

12. The method of claim 8, wherein the search byte fields comprise the fields designated to store a size of the event record, a date on which the event occurred, and a time at which the event occurred.

13. The method of claim 12, wherein the event data comprises:
   a value representing an event type;
   the size of the event record and an indicator as to whether the event data is unread;
   the date and time at which the event occurred; and
   additional event specific information based on the event type.

14. A computer storage medium having computer-executable instructions stored thereon which, when executed by a computer, cause the computer, cause the computer to perform the method of claim 1.

15. A system for providing an operating system independent utility application for performing one or more functions on event data recorded in an event log within a computer, the system comprising:
   a display;
   a memory;
   a central processing unit;
   a basic input/output system for controlling the basic input/output functions of the computer and comprising a utility application for providing functions for reading and displaying the event data independent of a previously stored indicator of a next unused memory record.

16. The system of claim 15, wherein the events are displayed with a timestamp and may be displayed in one or more languages.

17. The system of claim 15, wherein the utility application is operative to further provide at least one function for erasing the event data recorded in the event log and updating an independent and previously stored indicator of a next unused memory record.

18. The system of claim 15, wherein the utility application is operative to further provide at least one function for marking the events in the event log as read such that the events that are marked as read are filtered from display in subsequent displays.

19. The method of claim 15, wherein the utility application is operative to further provide at least one function for compiling and displaying statistics concerning the events recorded in the event log.

20. The system of claim 19, wherein at least one of the statistics comprises a total size of the event log.

21. The system of claim 19, wherein at least one of the statistics comprises a number of unread events.

22. The system of claim 19, wherein at least one of the statistics comprises a number of unused memory records in the event log.

23. A computer operative to record the occurrence of one or more events occurring within the computer, the computer comprising:
   a memory;
   a central processing unit;
   a basic input/output system stored in the memory for controlling the basic input/output functions of the computer and wherein the basic input/output system is operative to define a unique erased value that identifies one or more unused memory records in an event log wherein each memory record comprises one or more fields, receive notification that at least one event has occurred, determine event data values based on the notification, in response to the occurrence of the at least one event, identify at least one unused memory record in the event log by searching the event log for a next memory record containing the erased value in one or more search byte fields of the memory record, and in response to identifying the at least one unused memory record, store in the identified memory record the event data values for the event that occurred.

24. The computer of claim 23, wherein the erased value comprises the hexadecimal value 0FFh and the search byte fields comprise the fields designated to store a size of the event record, a date on which the event occurred, and a time at which the event occurred.

25. The computer of claim 24, wherein the event data comprises:
   a value representing an event type;
   the size of the event record and an indicator as to whether the event data is unread;
   the date and time at which the event occurred; and
   additional event specific information based on the event type.

26. The computer of claim 25, wherein the basic input/output system further comprises an operating system independent utility application for performing one or more functions on the event log, wherein the functions comprise:
   reading and displaying the contents of the event log;
   erasing the contents of the event log;
   marking events in the event log as read; and
   compiling and displaying one or more statistics concerning the event data recorded in the event log whereby each of the functions are performed independent of a previously stored indicator of a next unused memory record.

27. The computer of claim 26, wherein the statistics comprise:
   a total size of the event log;
   a number of unread events; and
   a number of unused memory records in the event log.

28. The computer of claim 27, wherein the basic input/output system is further operative to:
   in response to the occurrence of a power event within the computer, identify the location of a next unused memory record in the event log by searching the event log for a next memory record containing the erased value 0FFh;
   determine whether the location of the next unused memory record is identical to a previously stored indicator of the next unused memory record; and
   in response to determining that the location of the next unused memory field is different than the previously stored indicator, update the previously stored indicator to reflect the identified location of the next unused memory record.

29. The computer of claim 26, wherein the power event comprises a powering on of the computer and wherein the previously stored indicator is updated subsequent to the execution of one or more power on test procedures.

30. The computer of claim 26, wherein the power event comprises a powering on of the computer and wherein the previously stored indicator is updated prior to the execution of one or more power on test procedures.

31. The computer of claim 26, wherein the power event comprises a reset of the computer.

* * * * *